March 7, 1972  M. R. KEGELMAN  3,647,557

HOLLOW, GAS PERMEABLE FIBER VENTED SEALED GALVANIC CELLS

Filed Aug. 19, 1970

INVENTOR
MATTHEW ROLAND KEGELMAN

BY Michael J. Bradley

ATTORNEY

United States Patent Office
3,647,557
Patented Mar. 7, 1972

3,647,557
HOLLOW, GAS PERMEABLE FIBER VENTED SEALED GALVANIC CELLS
Matthew Roland Kegelman, Wilmington, Del., assignor to E. I. du Pont de Nemours and Company, Wilmington, Del.
Filed Aug. 19, 1970, Ser. No. 65,200
Int. Cl. H01m 1/06
U.S. Cl. 136—177                                8 Claims

ABSTRACT OF THE DISCLOSURE

Sealed galvanic cells having high structural strength and minimum volume can be produced that have sufficient gas venting systems by disposing at least one liquid impervious, gas pervious hollow fiber in the galvanic cell such that the interior of the hollow fiber communicates only with the external atmosphere surrounding the cell.

BACKGROUND OF THE INVENTION

Figure 1:
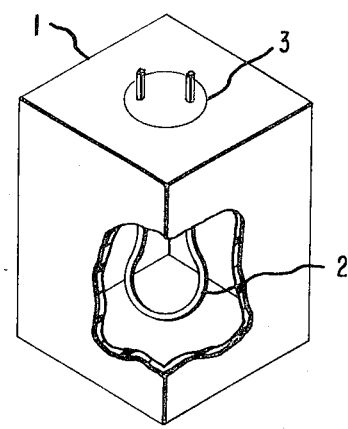

Galvanic cells and batteries of such cells are widely employed as power sources for portable electrical equipment, e.g. cine cameras, radios, lights, power tools, etc. Such cells or batteries are normally sealed in a non-reactive, non-deformable container to prevent leakage of corrosive, potentially damaging liquid contents of the cell or battery into the apparatuses utilizing such power sources. Leakage of corrosives, e.g. of electrolyte, tends to shorten the useful life of such cells. Gas pressure buildup within a cell is a major problem where it is desirable to prevent such leakage. Many otherwise practical galvanic systems tend to produce gas and therefore build up pressure within sealed containers. The pressure buildup can become sufficient to force liquid contents from the container or even to rupture the container of such cells. Effective sealing is of particular importance for those galvanic cells having active metal anodes, e.g. a lithium anode. Here, not only leakage outward needs to be controlled for the reasons above, but also leakage inward of moisture must be practically minimized to prevent attack of the moisture on the anode.

High energy density galvanic cells and batteries are designed to produce maximum energy density per unit volume and/or per unit weight so that much higher drain rates per unit volume are possible. As the drain rate per unit volume increases gas production per unit volume often also increases, thus making leakage or even rupture more likely.

A number of expedients has been disclosed for relieving this pressure buildup by building into the cell a gas venting means, including a means of allowing the gas to escape to the atmosphere by permeation. Southworth in U.S. 3,219,488 discloses venting gas from a galvanic cell through a thin, gas permeable, liquid impermeable, reinformed film, e.g. of nylon, which is designed to rupture rapidly upon excessive buildup of gases. Disadvantages in the use of thin films are that they stretch and undergo cold flow under pressure. To prevent this Southworth discloses use of special sealing washers. A further disadvantage is that such thin film venting system is inherently low in venting capacity and therefore, as taught by Southworth, must be so constructed that it can rupture when excess pressure develops within a cell. Such rupture would, or course, both open the cell to the moisture of the atmosphere and permit possible leakage of liquid cell contents. Permeation rate through such film increases with increasing film area and with decreasing film thickness. Increasing film area tends to increase difficulties of handling and reinforcing the film. Decreasing film thickness makes premature rupture more likely. The complex balance of film area, thickness, film reinforcement means and preselected film rupture conditions renders such venting means relatively complex and therefore relatively costly to employ.

Marsal et al. in U.S. 2,632,784 disclose venting a battery by means of a plurality of gas permeable solid fibers sealed within the battery container but communicating with the external atmosphere. The rate of gas permeation through the solid fibers of Marsal is much too low to prevent gas buildup without introducing an excessively large number of fibers into the cell and thereby affecting cell size and energy density.

SUMMARY OF THE INVENTION

Galvanic cells and batteries of galvanic cells sealed in a liquid impervious case can be vented to prevent buildup of internally produced gas and liquid leakage from or rupture of the sealed case by disposing in the galvanic cell at least one liquid impervious, gas pervious hollow fiber in the galvanic cell such that the interior of the hollow fiber communicates only with the external atmosphere surrounding the cell.

DESCRIPTION OF THE INVENTION

The invention comprises utilizing a hollow fiber or a plurality of such fibers as a gas permeable, liquid impermeable membrane separating the contents of a sealed cell from the atmosphere outside the cell.

Figure 2:
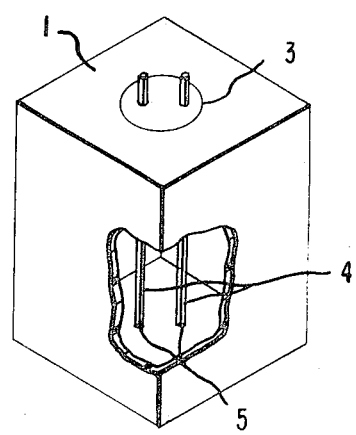

With reference to the figures, FIG. 1 shows a sealed cell container 1 having disposed therein a hollow fiber 2. The hollow fiber exit the cell through a suitable seal 3. FIG. 2 shows another embodiment in which the hollow fibers 4 have only one open end, the end 5 being sealed by a suitable means such as heating sealing.

It will be appreciated that the seal 3 should be resistant to the passages of gas or electrolyte liquid. To attain such resistance the sealant material should form a gas tight contact with the edges of the container opening and with the outer wall of the hollow fiber or with each outer wall of individual fibers in a composite, e.g. in a bundle of hollow fibers. Suitable sealing means may be adapted from well-known hollow fiber technology such as that disclosed, for example, in U.S. Pats. 3,198,335 and 3,228,876. Simple potting of exiting fibers in an epoxy resin plug seal is practical.

Hollow fibers suitable for this invention can vary widely in composition and dimensions. The hollow fiber material must be practically resistant to attack by cell or battery contents which it contacts, e.g. aqueous or non-aqueous electrolyte. The hollow fiber wall must be permeable to the gas developed in the cell or battery and practically impermeable to the electrolyte in the cell or battery. For use in cells or batteries having water reactive, active metal anodes such as lithium, hydrophobic hollow fibers having a high degree of impermeability to external moisture are preferred Suitable hollow fibers can be spun from a wide variety of materials such as, for example, cellulose acetate, polyethylene, polypropylene, poly-4-methylpentene-1, terpolymers of acrylonitrile, butadiene and styrene, polymeric silicones, copolymers of tetrafluoroethylene with isobutylene or vinyl acetate, copolymers of styrene and acrylonitrile, nylon and like materials having practical resistance to cell or battery contents, low liquid permeability and high gas permeability. Preferred, in cells and batteries having active metal anodes, e.g. lithium, and nonaqueous electrolyte, because of their hydrophobic nature, inertness towards most cell components and high gas permeability are hollow fibers spun from polyethylene, polypropylene, and poly-4-methylpentene-1. The spinning of polymeric hollow fibers may be accomplished by well-known means such as are disclosed, for example, in U.S. 2,999,296.

Hollow fiber dimensions, i.e. internal and external shape and cross section and length are not critical so long as the hollow fiber or the plurality of hollow fibers can adequately vent a sealed cell or battery. That is, can adequately prevent the buildup of sufficient gas pressure to cause leaking or container rupture. It will be appreciated that adequate fiber numbers and dimensions cannot be simply defined for all different cells or batteries wherein such fibers are to be employed. Gas production rates vary with cell type, the electrical drain applied thereto and with cell size. It is, however, well within the skill of the art of cell or battery container sealing to experimentally choose the proper fiber dimensions and numbers to prevent buildup of pressures which cause leaking.

Preferred hollow fibers are cylindrical and the cross-sectional dimensions for such hollow fibers range from about $10\mu$ external diameter and about $6\mu$ internal diameter to about $250\mu$ external diameter and about $210\mu$ internal diameter. Polymeric fibers within this range of cross-sectional dimensions are flexible, resistant to distortions or closure by pressure and to crimping, have high gas permeability relative to fiber volume, are easily sealed into cells and batteries and are readily available or easily prepared in practically continuous lengths.

Particularly preferred because they require minimum space within a cell or battery and also permit close electrode spacing, e.g. down to $100\mu$ or less, are hollow fibers having no more than about $60\mu$ external diameter. Fibers having from about 10 to about $60\mu$ external diameter and, complementally, from about 6 to about $40\mu$ internal diameter are most preferred.

Such hollow fibers, disposed in a pad, can even replace the customary and insulating bibulous spacer between cell electrodes and thereby serve two purposes simultaneously.

The disposition of hollow fibers within a cell may be in the liquid electrolyte or in a free space in the container where the gas collects. In a battery comprising, for example, a stack of individual galvanic cells, the hollow fibers can be disposed between one or more electrodes of the battery or in a free space within the battery container in which gas collects upon escaping from the space between electrodes.

EXAMPLE 1

The cell assembly used in this example had the hollow fiber disposed in loop form within the electrolyte and disposed between the anode and cathode. Suitable moisture and airtight connections are made with the cell to provide for evacuation of the cell, filling of the cell with electrolyte and for measurement of pressure within the cell. The cathode and anode are held in nickel plates. Each plate had a machined, cylindrical recess to contain electrode material. A polypropylene spacer ring of larger diameter than the recesses was provided for spacing the plates apart. A hole drilled in each plate in the area outside the electrode but inside the spacer ring permitted access to the interior of the cell assembly.

The cell was assembled without electrolyte by tightly fitting a coherent copper sulfide disk into the recess of one of the plates. The disk had a face area of 6.55 cm.$^2$ and contained 1.1 ampere-hour of copper sulfide (calculated as $CuS \rightarrow Cu° + S^=$). The recess in the anode plate was filled in a dry argon atmosphere with 1.4 ampere-hours of lithium metal. A single cylindrical polypropylene hollow fiber 30 cm. long, having $52\mu$ external diameter and $30\mu$ internal diameter was looped to fit inside the spacer ring against the lithium anode. The two ends of the fiber exited through a hole in the anode plate which hole and exiting fiber exterior walls had been previously sealed with epoxy cement so the fiber ends extended outside the plate. The anode and cathode plates were bolted together in the argon atmosphere with insulated bolts against the spacer ring and against a pad of compressible ceramic fiber so placed as to hole the loops of hollow fiber against the lithium anode. The hold in the cathode plate, previously fitted with a valved line was used to evacuate the cell assembly and the cell was filled with an electrolyte consisting essentially of a 20 weight percent solution of $LiPF_6$ in methyl acetate. The cell was removed from the argon atmosphere and discharged over 3.4 days (81 hr.) at a current of 11.1 milliamperes and at an average voltage of 1.7 volts to an arbitrary 1 volt cut-off. The rate of gas evolution from the external ends of the hollow fiber loop was measured during and after the discharge. The following results were obtained.

TABLE

| Time after starting discharge, days: | Rate of gas escape at fiber ends, ml. per day |
|---|---|
| 0.8 | 1.2 |
| 2.1 | 1.7 |
| 2.8 | 2.2 |
| 3.4 (end of discharge) | 4.0 |
| 3.6 | 18.0 |
| 3.8 | 12.4 |
| 6.0 | 0.8 |

A total of 10 ml. of gas was evolved from the cell. When the valve sealing the cell was opened after 8 days from the start of discharge only 0.17 ml. of residual gas escaped before the cell was at atmospheric pressure. There was no visible liquid leakage from the cell or from the fiber ends during the test period.

These results show the amazing ability of a single hollow fiber, occupying only about 0.2% of the volume of 0.28 cm.$^3$ space between the electrodes, to vent off gas produced in a galvanic cell. The single fiber loop, therefore, vented about 10/0.28 ml. of about 36 ml. of gas for each ml. of cell space between electrodes.

The following example demonstrates the ability of a plurality of such hollow fibers to maintain a practical and easily contained gas pressure within a cell.

EXAMPLE 2

A cell was prepared as in Example 1 except that 10 strands of the hollow fiber were disposed in the cell giving 20 exiting fiber ends through the epoxy seal and that the valved filler line was provided with a pressure transducer operably connected to a device for detecting and recording the signal from the transducer. The cell was discharged substantially as in Example 1. Gas evolved, during 72 hours discharge and during an additional 98 hours after discharge was terminated, measured 5.3 ml. Maximum pressure reached during the 170 hour test period was only 1.1 atmospheres gauge. Neither the cell nor the fibers leaked liquid during the test. The cell produced 700 watt-hours per kg. of lithium and CuS.

EXAMPLE 3

A cell was prepared and discharged as in Example 2 without the hollow fibers. Pressure within the cell built up to 6 atmospheres gauge pressure at which point the cell was vented through the valve to prevent damage to the pressure transducer in the pressure gauge system. Five ventings to atmospheric pressure were necessary during the 170 hour test to maintain internal pressure below 6 atmospheres gauge. The cell produced 670 watt-hours per kg. of lithium and CuS.

The results of Example 3, compared with those of Example 2, show that a bundle of fibers ocupying only $0.015/0.28 \times 100$ or 5.4% of the space between the electrodes was fully adequate to keep the internal cell pressure within practical limits. That is to say, that a pressure increase of only 1.1 atmospheres in a cell or battery of cells could easily be contained by current, practical cell or batery container sealing means.

The lose bundle of fibers, each fiber only $52\mu$ thick, would not interfere with very close electrode spacing. Cell performance of Examples 2 and 3 (700 watt-hours per kg. of lithium and CuS, vs. 670 watt hours per kg. of lithium and CuS) indicated there was no significant backflow of moisture into the cell, despite the fact that the 20 exiting fiber ends were submerged in the water of a gas trap for gas volume measurement.

I claim:

1. In a sealed galvanic cell comprising a liquid impervious case containing at least one galvanic cell, the improvement comprising at least one liquid impervious, gas permeable hollow fiber disposed in said galvanic cell and having at least one open end and an interior communicating only with the external atmosphere through said open end to allow venting of gases produced in said galvanic cell.

2. The improved cell of claim 1 in which the hollow fiber has cross-sectional dimensions of from about $6\mu$ internal diameter and about $10\mu$ external diameter to about $210\mu$ internal diameter and about $250\mu$ external diameter.

3. The improved cell of claim 1 in which the cross-sectional dimensions are from about $6\mu$ internal diameter and about $10\mu$ external diameter to about $40\mu$ internal diameter and about $60\mu$ external diameter.

4. The improved cell of claim 1 in which the galvanic cell is a high energy density cell having water reactive metal anode and as non-aqueous electrolyte and the liquid impervious gas permeable hollow fiber is also moisture impervious.

5. The improved cell of claim 4 in which the hollow fiber has cross-sectional dimensions of from about $6\mu$ internal diameter and about $10\mu$ external diameter to about $210\mu$ internal diameter and about $250\mu$ extrenal diameter.

6. The improved cell of claim 4 in which the cross-sectional dimensions are from about $6\mu$ internal diameter and about $10\mu$ external diameter to about $40\mu$ internal diameter and about $60\mu$ external diameter.

7. The improved cell of claim 1 in which the hollow fiber is polypropylene and has cross-sectional dimensions of about $30\mu$ internal diameter and about $52\mu$ external diameter.

8. The improved cell of claim 4 in which the hollow fiber is polypropylene and has cross-sectional dimensions of about $30\mu$ internal diameter and about $52\mu$ external diameter.

References Cited

UNITED STATES PATENTS

| | | | |
|---|---|---|---|
| 2,697,738 | 12/1954 | Glesner | 136—177 |
| 3,159,508 | 12/1964 | Chreitzberg | 136—177 |
| 3,198,335 | 8/1965 | Lewis et al. | 210—321 |

FOREIGN PATENTS

| | | | |
|---|---|---|---|
| 318,329 | 2/1902 | France | 136—177 |

DONALD L. WALTON, Primary Examiner

U.S. Cl. X.R.

220—44 R